No. 634,796.  
Patented Oct. 10, 1899.  
E. J. BEALE.  
CORN SHELLING AND FODDER SHREDDING ATTACHMENT FOR THRESHING MACHINES.  
(Application filed Feb. 26, 1898.)  
(No Model.)  
2 Sheets—Sheet 2.
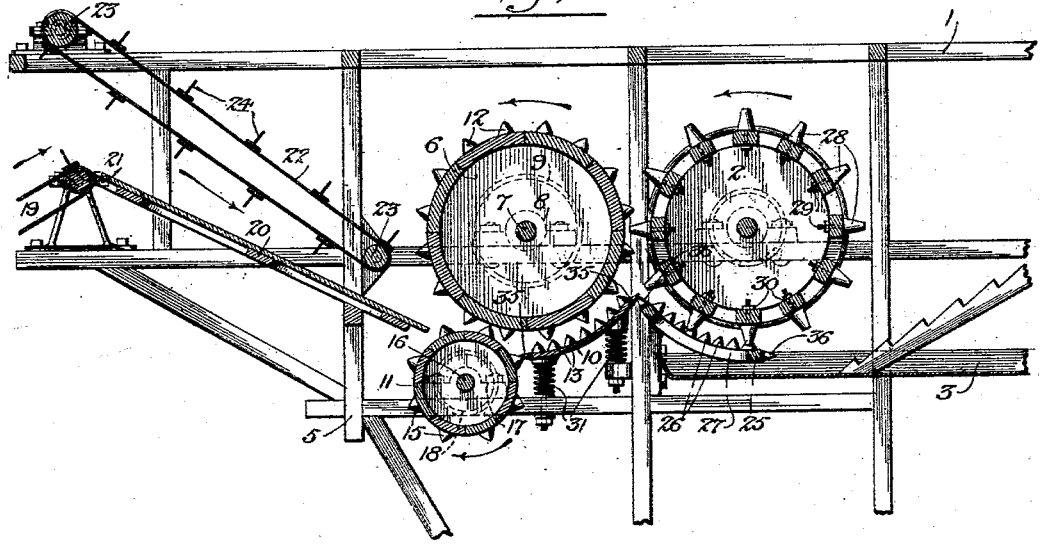
Fig. 3.
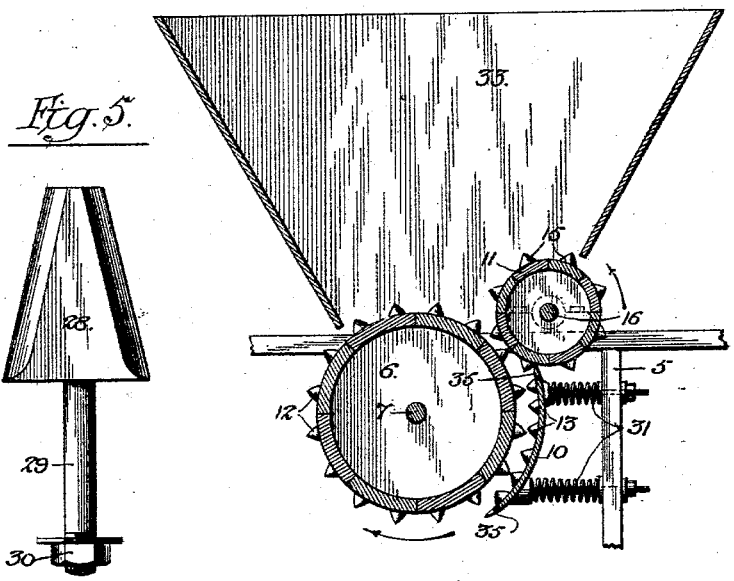
Fig. 4.
Fig. 5.
Witnesses:—  
Edwin J. Beale, Inventor:—  
By his Attorneys,

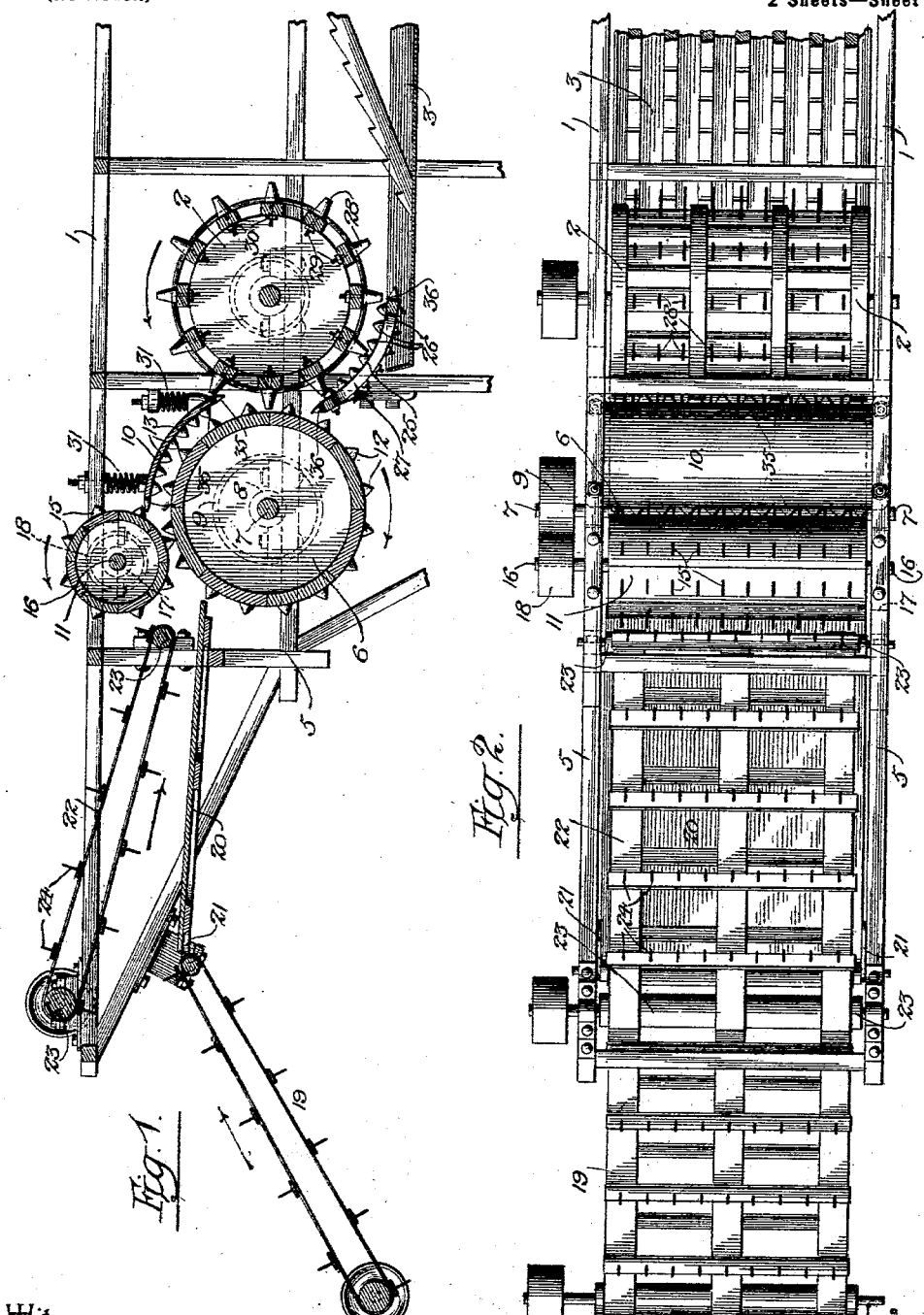

UNITED STATES PATENT OFFICE.

EDWIN J. BEALE, OF COLES COUNTY, ILLINOIS.

CORN-SHELLING AND FODDER-SHREDDING ATTACHMENT FOR THRESHING-MACHINES.

SPECIFICATION forming part of Letters Patent No. 634,796, dated October 10, 1899.

Application filed February 26, 1898. Serial No. 671,760. (No model.)

*To all whom it may concern:*

Be it known that I, EDWIN J. BEALE, a citizen of the United States, residing in the county of Coles and State of Illinois, have invented a new and useful Corn-Shelling and Fodder-Shredding Attachment for Threshing-Machines, of which the following is a specification.

This invention is a corn-shelling and fodder-shredding attachment to threshing-machines by which I am able to mutilate and tear the corn-husks which enshroud the ear, cut up and shred the fodder, and mechanically separate the grains of corn from the fodder and refuse all in one continuous operation, thereby utilizing the threshing-cylinder, the cleaning-shoe, and the other working parts of the threshing-machine in the operation of cleaning the grains of corn from the refuse.

A further object of the invention is to provide an improved appliance in which the parts are arranged for reversal in operative relation to each other, so that the sharp edges of the teeth or blades may be presented to the ears and fodder for operating thereon, whereby when the teeth become dulled through service the concaves and cylinders may be reversed to bring the sharp edges of the teeth or knives into service, thereby greatly prolonging the life of the appliance.

To the accomplishment of these ends my invention consists in the combination, with a threshing-machine and the threshing-cylinder thereof, of a corn-shelling cylinder situated in close relation to and in advance of the threshing-cylinder, a shelling-concave in operative relation to the shelling-cylinder, a force-feed cylinder parallel to the shelling-cylinder and in close relation to the passage or opening between the shelling cylinder and concave, a feed mechanism for conveying the ears and fodder to the shelling and force-feed cylinders, and a shredding-concave which receives the mutilated ears and fodder from the shelling cylinder and concave to present the same to the threshing-cylinder, said shredding-concave being provided with openings or slots, through which the loosened grains of corn may pass to the grain-pan of the threshing-machine; and the invention further consists in the novel combination of elements and in the construction and arrangement of parts, which will be hereinafter described and claimed.

To enable others to understand my invention, I have illustrated one embodiment thereof in the accompanying drawings, forming a part of this specification, and in which—

Figure 1 is a sectional elevation showing parts of a threshing-machine with my corn shelling and shredding appliance in operative relation to the threshing-cylinder. Fig. 2 is a plan view of the parts represented by Fig. 1. Fig. 3 is a sectional elevation similar to Fig. 1, but showing the force-feed cylinder and the shelling-concave in operative relation to the lower side of the shelling-cylinder, the feed mechanism being changed or adjusted to feed the ears and fodder to the shelling and force-feed cylinders. Fig. 4 is a sectional elevation of another arrangement of the shelling mechanism. Fig. 5 is a detail view, on an enlarged scale, of one of the double-edged reversible teeth used in my shelling and shredding mechanism.

Like numerals of reference denote like and corresponding parts in each of the figures of the drawings.

In order that others skilled in the art to which this invention relates may understand my improved appliance, I have illustrated the same in operative relation to a threshing-machine in the accompanying drawings.

It is to be understood that the threshing-machine or separator, *per se*, forms no part of my invention, which relates to an appliance adapted for use in connection with ordinary threshing-machines to use the working parts of the latter as a means for mechanically separating the husks, fodder, and other refuse from the grains of corn.

The frame or casing of the threshing-machine is indicated at 1, the threshing-cylinder at 2, and the grain-pan at 3; but in the preferred embodiment of this invention I replace the cylinder-spikes with shredding-teeth of peculiar form and employ a new construction of concave for use in connection with said threshing-cylinder for the purpose of completing the shredding and mutilation of the fodder prior to the delivery of the fodder and refuse from the threshing mechanism to the cleaning and separating mechanism proper of the threshing-machine.

To apply my invention to a threshing-machine, I resort to a carrying-frame 5, which is of any suitable or preferred construction and rigidly fastened to the machine casing or frame 1 for the purpose of sustaining the shelling-cylinder 6 in advance of the threshing-cylinder 2. This shelling-cylinder lies in substantially the same horizontal plane as the threshing-cylinder, and it is parallel therewith; but the shelling and threshing cylinders are separated a suitable distance from each other to permit the crushed ears of corn and the partially-shredded fodder to pass between the cylinders and to the concave of the threshing-cylinder. The horizontal shelling-cylinder 6 has its shaft 7 journaled in suitable bearings 8, secured on the carrying-frame 5 of the attachment, and one end of the cylinder-shaft 7 is extended or prolonged beyond said carrying-frame for the reception of the belt-pulley 9, by which the shelling-cylinder is positively driven.

For properly removing the grains from the ears of corn I employ a shelling-concave 10, which lies in close operative relation to the cylinder 6, and in connection with the shelling cylinder and concave a force-feed cylinder 11 is employed for the purpose of partially cutting the fodder and of crushing the ears, so as to feed the latter between the cylinder and concave 6 10, respectively.

The shelling-cylinder 6 is provided on its cylindrical surface with a plurality of double-edged teeth 12, arranged in any suitable order thereon and attached thereto in any desirable way. The face of the concave 10 which is opposed to the toothed surface of the shelling-cylinder is likewise provided with a plurality of double-edged teeth 13, which are also arranged in any suitable manner on the concave, but which should be so disposed thereon as to provide for the free rotation of the shelling-cylinder without the teeth thereof coming in contact with the teeth 13 of said concave, and, finally, the force-feed cylinder 11 is equipped with a plurality of double-edged teeth 15, which are attached to said cylinder in a suitable manner and are detachably fastened in place to permit of the ready removal of said teeth 15 for the purpose of sharpening the same when desired.

The force-feed cylinder 11 is parallel to the shelling-cylinder 6, and it is situated in close relation to the toothed working surface of said shelling-cylinder and in advance of the concave 10, so that the force-feed cylinder is in the path of the line of feed to the shelling cylinder and concave, whereby the force-feed cylinder is arranged to crush or crowd the ears and fodder between itself and the shelling-cylinder to properly feed the same to the space or opening between the cylinder and concave 6 10, and its knives 15 are caused to cut the fodder in short pieces. The cylinder 11 is carried by a shaft 16, journaled in bearings 17, suitably mounted on the frame 5 of the attachment, and one end of this shaft 16 carries a pulley 18, by which the force-feed cylinder may be driven positively.

The corn and fodder are conveyed to the machine by an endless elevator 19, which is preferably arranged in the inclined position shown by Figs. 1 and 3 and which has its upper delivery end terminating a suitable distance from the shelling-cylinder, and the space between said delivery end of the elevator and the shelling-cylinder is spanned by a feed or delivery table 20, which has its forward end hinged or pivotally connected, as at 21, to the rear end of the elevator-frame, the opposite end of said feed-table terminating in close relation to the shelling-cylinder and being sustained in a substantially fixed relation thereto by any suitable means.

The ears and fodder deposited by the elevator upon the feed-table are fed or moved across said table by the action of an elevated comb-feeder 22. This feeder is preferably of the endless belt or apron variety, as shown. It is operatively supported by the rollers 23, one of which is belted to the driving mechanism of the machine for the purpose of being positively driven and imparting the necessary traveling movement to the apron or belt, and the feeder has a series of sharp teeth or blades 24, which are attached to said apron or belt in any suitable manner. The comb-feeder is arranged to have its front end terminate over the delivery end of the elevator 19, while its other end is adjacent to the shelling and force-feed cylinders, whereby said feeder moves the ears and fodder across the table 20 for delivering the same to the shelling mechanism of the attachment.

The ordinary concave which is used in connection with the threshing-cylinder 2 is removed from the machine 1, and it is replaced by a shredding-concave 25, which lies in inclined relation to the threshing-cylinder 2 and the shelling-cylinder 6, said concave 25 being in rear of and close to the shelling-cylinder, as shown by Fig. 1. This shredding-concave has its working surface formed by a plurality of short sharp teeth 26, which operate in connection with the teeth on the threshing-cylinder to cut the partially-shredded fodder and complete the mutilation thereof, and said shredding-concave 25 is further provided with transverse openings or slots 27, through which the grains of corn which have been shelled or loosened from the ears by the action of the shelling and threshing mechanisms are free to pass and lodge upon the grain-pan 3 of the threshing-machine 1.

As before indicated, the long spikes or teeth of the ordinary threshing-cylinder are removed and their place is supplied by the double-edged teeth 28, which are reversibly attached to the bars of the threshing-cylinder 2, so that when one edge of a tooth becomes dulled the tooth may be reversed to present its unused sharp edge for service. I prefer to provide each tooth 28 of the threshing-cylinder with an extended shank 29 and with a nut 30, by which the tooth may be secured rigidly in place in the bar of the cylinder 2, and as the nut 30 can readily be loosened the tooth may be reversed, for the purpose before mentioned.

My invention is not restricted to any particular arrangement of the shelling-concave and force-feed cylinder with relation to the shelling-cylinder, and in Figs. 1 and 3 of the drawings I have illustrated different positions of the shelling-concave and the force-feed cylinder to said shelling-cylinder. As shown by Fig. 1 of the drawings, the force-feed cylinder lies above the shelling-cylinder, while the shelling-concave extends from said force-feed cylinder partly around the shelling-cylinder and terminates at its lower edge substantially in rear of the shelling-cylinder 6 and adjacent to the threshing-cylinder 2. In this arrangement of the parts the shelling-cylinder 6 is adapted to be driven or rotated in a reverse direction to the revolution of the threshing-cylinder, as indicated by the arrow, while the force-feed cylinder 11 rotates in a reverse direction to the shelling-cylinder and in the same direction as the threshing-cylinder, as shown by the arrow. In Fig. 3 of the drawings the concave and force-feed cylinder are shown in operative relation to the under side of the shelling-cylinder, and when the parts are arranged as shown by this figure the feed-table 20 and the comb-feeder 22 are dropped down to the position shown by said Fig. 3, so that the ears and fodder are supplied to the shelling and force-feed cylinders to be crushed and mutilated thereby and crowded into the passage between the shelling cylinder and concave. In this arrangement of the elements constituting the shelling and shredding mechanism the shelling-concave 10 is arranged to deliver to the shredding-concave 25 and the crushed and mutilated ears and fodder are carried by the teeth of the shelling-cylinder along the shelling-concave to be deposited upon the shredding-concave, so that the teeth 28 of the threshing-cylinder will draw the ears and fodder across the short sharp teeth 26 of the shredding-concave to complete the operation of mutilating the fodder and to beat the mass, so as to cause the loosened grains of corn to fall through the slots in the concave 25 and lodge upon the grain-pan 3.

While I have shown different arrangements of the force-feed cylinder and the shelling-concave with relation to the shelling-cylinder, I do not desire to restrict myself to the particular organization herein shown, because I am aware that the force-feed cylinder and the shelling-concave may be placed in different positions—as, for instance, in front or in rear of the shelling-cylinder. When the force-feed cylinder and the concave are placed below the shelling-cylinder, as shown by Fig. 3, the power connections from the threshing-machine to the shelling and shredding mechanism are arranged to rotate the shelling-cylinder 6 in the same direction as the threshing-cylinder 2, while the force-feed cylinder is driven in a reverse direction to the planes of revolution of said shelling and threshing cylinders, all as indicated by the arrows in Fig. 3.

The shelling-concave 10 is held in yielding relation to the shelling-cylinder 6 by means of the pressure-springs 31, and said concave is also adjustably supported to the shelling-cylinder for the purpose of varying the width of the opening or passage between said concave or cylinder.

One of the important features of my invention consists in the employment of double-edged teeth on the shelling and shredding concaves and in securing said concaves detachably in place, so that they may be disconnected and reversed edge for edge or end for end for the purpose of bringing into service the other unused and sharp edges of the teeth thereon.

Persons skilled in the art to which my invention relates are well aware that in shelling corn the working teeth soon become dulled through continued or prolonged service, and one of the objections to ordinary corn-shellers resides in the difficulty in keeping the teeth in sharp working condition. I overcome these objections by the employment of double-edged teeth and securing said teeth to concaves which are reversibly fastened in place, so that when the teeth become dull on one edge the parts may be reversed to bring the other edges of the teeth into service. This prolongation in the life and service of the machine is furthered by the doubled-edged reversible teeth on the threshing-cylinder, and the shelling and force-feed cylinders are also mounted removably in their bearings for the purpose of reversing said cylinders end for end to permit both edges of the teeth thereon to be brought into operative relation to the material to be operated upon, such reversal of the cylinders making the teeth self-sharpening.

In the operation of the machine the elevator carries the ears and fodder to the feed-table 20 and the traveling comb-feeder 22 drags the ears and fodder from the elevator across said table 20 and delivers to the toothed shelling and force-feed cylinders. These cylinders partially crush the ears, the knives of the cylinder cut the fodder, and the cylinders 6 11 coact in crowding or forcing the ears and fodder between the cylinder 6 and the concave 10. Said cylinder and concave coöperate in shelling the corn from the ears, and the crushed ears and partially-shredded fodder are delivered to the threshing-cylinder and shredding-concave, the teeth of which threshing-cylinder drags the fodder and ears violently across and over the short sharp teeth of the concave 25, thereby completely shredding the fodder. The threshing-cylinder runs at a faster speed than the shelling-cylinder 6 and the threshing-cylinder acts as a balance-wheel and as a beater, because the threshing-cylinder rapidly carries the crushed ears and fodder from the shelling-cylinder, thereby preventing "backlash" or choking of the shelling-cylinder. The violent agitation given to the fodder and crushed ears between the shredding-concave and threshing-cylinder causes the shelled or loosened grains of corn to pass through the concave and caught by the grain-pan, and the mutilated or shredded refuse matter and the corn are carried through the threshing-machine and subjected to the action of the separators, the shoe, and the riddles therein, whereby the refuse is separated from the corn to be carried over the straw-stacker and the corn is cleaned and discharged separately from said refuse.

In the embodiment of the invention illustrated by Fig. 4 I have shown the shelling-cylinder and the force-feed cylinder as arranged practically side by side to be fed or supplied with ears of corn in either a husked or unhusked condition from a feed-hopper 33. The force-feed cylinder and the shelling-concave may be arranged on either side of the shelling-cylinder, and said concave is removably secured in place, so that it may be reversed end for end to prolong the service of its teeth. I also provide the shelling and threshing concaves with comb-teeth, by which the concaves are arranged to work in close relation to the shelling and force-feed cylinders and prevent the corn from passing between the cylinder and concave and obviate choking of the passages by the wedging of fodder between the cylinder and concaves. The machine constructed as shown by Figs. 1 and 2 has the shelling-concave 10 provided at its edges with the comb-teeth 35, so that the edges of the concave 10 adjacent to the cylinder 11 are in alternate relation to the teeth of said force-feed cylinder 11, while in like manner the edges of the threshing-concave 25 are provided with comb-teeth 36 for the purpose of lying close to the shelling-cylinder 6, so that the comb-toothed edge of the threshing-concave will have said teeth in alternate relation to the teeth of the shelling-cylinder.

In the arrangement of parts represented by Fig. 3 the edges of the threshing-concave may be provided with the comb-teeth, and the edges of the shelling-concave adjacent to the force-feed cylinder 11 are similarly provided with comb-teeth. This formation of the concave with comb-teeth in close relation to the force-feed cylinder also applies to the mechanism shown by Fig. 4.

My improvements are designed for shelling and shredding various kinds of corn and fodder, including Kafir corn, Milo maize, and Jerusalem corn.

I am aware that changes in the form and proportion of parts and in the details of construction may be made by a skilled mechanic without departing from the spirit or sacrificing the advantages of my invention, and I therefore reserve the right to make such modifications as clearly fall within the scope of the invention.

Having thus described the invention, what I claim is—

1. In an apparatus of the class described, the combination of a revoluble toothed shelling-cylinder, a concave arranged in active relation to the cylinder, and having upon its working surface a plurality of teeth coöperating with those of the cylinder, said concave being further provided at the edge thereof with projecting teeth, and a force-feed cylinder arranged contiguous to the shelling-cylinder and having teeth arranged to pass between the edge teeth of the concave, substantially as set forth.

2. In an apparatus of the class described, the combination of a toothed shelling-cylinder, a toothed shelling-concave arranged in active relation to the shelling-cylinder, a threshing-cylinder arranged at one side of the shelling-cylinder in close proximity thereto, a concave coöperating with the threshing-cylinder and having teeth similar to those of the other concave, both of said concaves having projecting comb-teeth at their edges, and a force-feed cylinder arranged contiguous to the shelling-cylinder and having teeth arranged to pass between the adjacent edge teeth of the shelling-concave, substantially as set forth.

3. In a threshing and corn-shelling mechanism, a threshing-concave and a shelling-concave situated in close relation one to the other and with the contiguous edges of said concaves provided with teeth which overlap one another, combined with a threshing-cylinder coacting with the threshing-concave, a shelling-cylinder in active relation to the shelling-concave, and a force-feed mechanism contiguous to the shelling-cylinder, substantially as described.

4. The combination of a revoluble shelling-cylinder provided with the double-edged teeth, a reversible concave having its working surface formed with a plurality of series of double-edged shelling-teeth and also provided at its edges with the projecting teeth, and a force-feed cylinder contiguous, and revoluble in an opposite direction to, the shelling-cylinder, and having teeth arranged to pass between the teeth on one edge of the concave, the latter being reversible to present either of its edge series of teeth to the force-feed cylinder as well as the teeth on the working face thereof to the shelling-cylinder, substantially as described.

5. The combination of a revoluble toothed shelling-cylinder, a reversible concave provided with teeth upon its working surface, and also at the opposite edges thereof, and a force-feed cylinder having teeth arranged to pass between the teeth at one edge of the reversible concave, substantially as set forth.

In testimony that I claim the foregoing as my own I have hereto affixed my signature in the presence of two witnesses.

EDWIN J. BEALE.

Witnesses:
M. WOODLAND,
P. L. VEACH.